(12) United States Patent
Kim

(10) Patent No.: US 6,671,016 B1
(45) Date of Patent: Dec. 30, 2003

(54) TRANSMISSION-REFLECTION TYPE LIQUID CRYSTAL DISPLAY DEVICE HAVING A SELECTIVELY REFLECTIVE FILTER LAYER

(75) Inventor: Yong Beom Kim, Kunpo (KR)

(73) Assignee: LG Philips LCD Co., Ltd., Seoul (KR)

( * ) Notice: Subject to any disclaimer, the term of this patent is extended or adjusted under 35 U.S.C. 154(b) by 153 days.

(21) Appl. No.: 09/585,408

(22) Filed: Jun. 2, 2000

(30) Foreign Application Priority Data

Jun. 2, 1999 (KR) ........................... 1999-20109

(51) Int. Cl.[7] ............................. G02F 1/1335
(52) U.S. Cl. ........................ 349/115; 349/114
(58) Field of Search .................. 349/98, 97, 115, 349/104, 119, 114

(56) References Cited

U.S. PATENT DOCUMENTS

| | | | | |
|---|---|---|---|---|
| 5,555,114 A | * | 9/1996 | Narita et al. ................. | 349/97 |
| 5,721,603 A | * | 2/1998 | De Vaan et al. ............. | 349/175 |
| 5,822,029 A | * | 10/1998 | Davis et al. ................. | 349/115 |
| 5,841,494 A | * | 11/1998 | Hall .............................. | 349/98 |
| 6,177,216 B1 | * | 1/2001 | Broer et al. ................... | 430/7 |
| 6,204,899 B1 | * | 3/2001 | Hall ............................. | 349/106 |
| 6,300,929 B1 | * | 10/2001 | Hisatake et al. .............. | 345/94 |
| 6,333,773 B1 | * | 12/2001 | Faris ........................... | 349/104 |

* cited by examiner

Primary Examiner—Kenneth Parker
(74) Attorney, Agent, or Firm—Birch, Stewart, Kolasch & Birch, LLP

(57) ABSTRACT

A transmission-reflection type liquid crystal display device including a first transparent substrate and a second transparent substrate; a liquid crystal layer between the first transparent substrate and the second transparent substrate; a linear polarizer and a resinoid color filter provided on the second transparent substrate; a left-handed cholesteric liquid crystal circular polarizer provided on the first transparent substrate; and a left-handed cholesteric liquid crystal color filter formed on the first transparent substrate in order to be situated between the cholesteric liquid crystal circular polarizer and the liquid crystal layer. The liquid crystal display device having this structure can be driven as a reflection type and a transmission type display. The cholesteric liquid crystal color filter having good color purity is added to the resinoid color filter to improve the overall color properties of the device.

20 Claims, 3 Drawing Sheets

TRANSMISSION-REFLECTION TYPE LIQUID CRYSTAL DISPLAY DEVICE HAVING A SELECTIVELY REFLECTIVE FILTER LAYER

BACKGROUND OF THE INVENTION

1. Field of the Invention

The present invention relates to a liquid crystal display device, and more particularly to a reflection type liquid crystal display device that can also function as a transmission type device.

2. Description of Related Art

A liquid crystal display device (LCD) is widely used as a planar display device for a variety of portable computers and portable televisions.

Liquid crystal display devices are classified into two types according to their use of a light source. One type is a transmission type liquid crystal display device, which uses a backlight provided on the back face of a liquid crystal panel as a light source. The other type is a reflection type liquid crystal display device, which uses an external light source such as sunlight or an indoor lamp.

It is difficult to decrease the volume, weight and power consumption of a transmission type LCD because of the presence of the backlight which is used as a light source. For a reflection type liquid crystal display device, the volume, weight and power consumption are low, because the reflection device need not use the backlight. However, if an external environment is dark, the reflection type liquid crystal display device cannot be used.

SUMMARY OF THE INVENTION

Accordingly, the present invention is directed to a transmission-reflection type liquid crystal display device that substantially obviates one or more of the problems due to limitations and disadvantages of the related art. In order to overcome the problems of the related art, an object of the present invention is to provide a transmission-reflection type liquid crystal display device which can be driven as a reflection type as well as transmission type. Another object is to provide a transmission-reflection type liquid crystal display device which has good color purity (e.g., calorimetric purity, which is defined by the 1996 Photonics Dictionary as "Ratio, to the luminance of a test color, of the luminance of the spectrum color that matches the test color when mixed with white light.").

The transmission-reflection type liquid crystal display device according to the present invention can be driven as a transmission type or reflection type display automatically or by user selection, depending on variations in an external environment. A cholesteric liquid crystal color filter is added to a conventional absorptive color filter and has a high color purity, so that overall color properties of a liquid crystal display device are improved.

In accordance with the purpose of the invention, as embodied and broadly described, in one aspect the invention includes a transmission-reflection type liquid crystal display device, including a first transparent substrate; a second transparent substrate; a liquid crystal layer between the first transparent substrate and the second transparent substrate; a linear polarizer on the second transparent substrate; a cholesteric liquid crystal circular polarizer provided on the first transparent substrate; and a cholesteric liquid crystal color filter provided on the first transparent substrate in order to be situated between the cholesteric liquid crystal circular polarizer and the liquid crystal layer.

In another aspect, the invention includes a liquid crystal display device capable of transmitting light from a backlight and reflecting ambient light, including a lower transparent substrate; an upper transparent substrate; a liquid crystal layer between the lower transparent substrate and the upper transparent substrate; a linear polarizer on the upper transparent substrate; a $\lambda/4$ phase shift plate between the linear polarizer and the liquid crystal layer; and a cholesteric liquid crystal color filter proximate to the lower transparent substrate to selectively reflect ambient light and to transmit light from the backlight.

In another aspect, the invention includes a liquid crystal display device capable of transmitting light from a backlight and reflecting light from a front of the device, including a polarizing layer; a phase shifting layer adjacent to the polarizing layer; a filter layer to selectively reflect light from the front of the device and to transmit light from the backlight; and a liquid crystal layer between the phase shifting layer and the reflecting layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate one embodiment of the invention and together with the description serve to explain the principles of the invention.

For convenience of description, like reference numerals in the figures denote like elements.

DETAILED DESCRIPTION OF THE INVENTION

Figure 1:
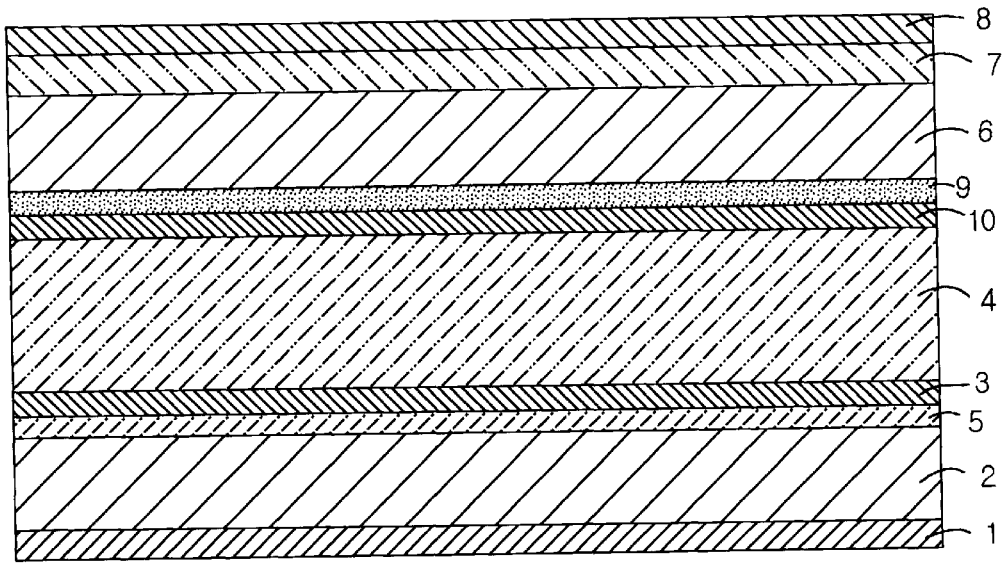
FIG. 1 is a sectional view showing a transmission-reflection type liquid crystal display device according to the present invention.

Hereinafter, a transmission-reflection type liquid crystal display device according to the present invention is described in detail referring to the drawings.

As shown in FIG. 1, a liquid crystal display device according to the present invention includes a first transparent substrate 2 and a second transparent substrate 6 where a plurality of pixel regions are defined. A liquid crystal layer 4 is located between the first transparent substrate 2 and the second transparent substrate 6. A linear polarizer 8 and a $\lambda/4$ phase shift plate 7 ($\lambda$ is a wavelength of light) are provided on an external side of the second transparent substrate 6. A transparent common electrode 10 and an absorptive color filter 9 are provided on the inner side of the second transparent substrate 6. A left-handed cholesteric liquid crystal right-handed circular polarizer 1 is provided on the external side of the first transparent substrate 2 and causes visible light to become right-handed circular polarized. A transparent pixel electrode 3 and left-handed cholesteric liquid crystal color filter 5 are provided on the inner side of the first transparent substrate 2.

The left-handed cholesteric liquid crystal color filter 5 provided on the first transparent substrate 2 and the absorptive color filter 9 provided on the second transparent substrate 6 are divided into red, green and blue regions corresponding to each pixel region. A color filter having permeability in a range of 50%~80% is used as the absorptive color filter 9 which is used in a reflection type liquid crystal display device.

In the left-handed cholesteric liquid crystal color filter 5, a red region includes a left-handed cholesteric liquid crystal having pitch $p_R=\lambda_R/n$, where $\lambda_R$ is a wavelength range corresponding to red, n:an average index of refraction of an extraordinary ray and an ordinary ray), a green region includes a left-handed cholesteric liquid crystal having pitch $p_G=\lambda_G/n$, where $\lambda_G$ is a wavelength range corresponding to the color green, and is as defined above. A blue region includes a left-handed cholesteric liquid crystal having pitch $p_B=\lambda_B/n$, where $\lambda_B$ is a wavelength range corresponding to the color blue, and n is as defined above. Therefore, in the cholesteric liquid crystal color filter 5, the red region reflects left-handed circularly polarized light component's corresponding to red color visible light; the green region reflects left-handed circularly polarized light component corresponding to green color visible light; and the blue region reflects a left-handed circularly polarized light component's corresponding to blue color visible light. In this case, a cholesteric liquid crystal color filter 5 is formed by one filter layer or by two or more layers.

The transparent pixel electrode 3 provided on a cholesteric liquid crystal color filter 5 is formed from a transparent conductive material like ITO (Indium Tin Oxide), which is laminated and then patterned on every pixel region. In this case, although not illustrated in the drawings, the transparent pixel electrode 3 is electrically insulated from transparent pixel electrodes of another pixel regions, and it is also connected to a thin film transistor (TFT, not shown in the drawings) formed in every pixel region. The thin film transistor functions as a switching element which transmits a pixel voltage to the transparent pixel electrode 3. When the pixel voltage is transmitted to the transparent pixel electrode 3, the pixel voltage is across the liquid crystal layer 4 situated between the transparent pixel electrode 3 and the transparent common electrode 10. The arrangement of liquid crystal molecules is controlled by the pixel voltage. The plurality of pixel regions are defined by multiple gate lines and data lines (not shown in the drawings) which intersect each other on the first transparent substrate 2.

The left-handed cholesteric liquid crystal right-handed circular polarizer 1 includes a left-handed cholesteric liquid crystal having a pitch $p=\lambda/n$, where $\lambda$ is a visible wavelength, and n is an average index of refraction of an extraordinary ray and an ordinary ray. That is, the cholesteric liquid crystal includes all pitches in a range of (380 nm~800 nm)/n. The right-handed circular polarizer 1 reflects only left-handed circularly polarized components in visible light, and the other components pass through the right-handed circular polarizer 1. In other words, the right-handed circular polarizer 1 transmits only right-handed circularly polarized components.

The liquid crystal layer 4 is oriented to introduce a phase shift of $\lambda/2$ into visible light which passes through the liquid crystal layer 4 when there is no voltage across the layer. The step of the liquid crystal is determined by the two orientation layers (not shown in the drawings) respectively adjacent to each upper and lower face of the liquid crystal layer.

Hereinafter, when the liquid crystal display device according to the present invention is operated as a reflection type device, its operation is described referring to FIG. 2A and FIG. 2B.

Figure 2A:
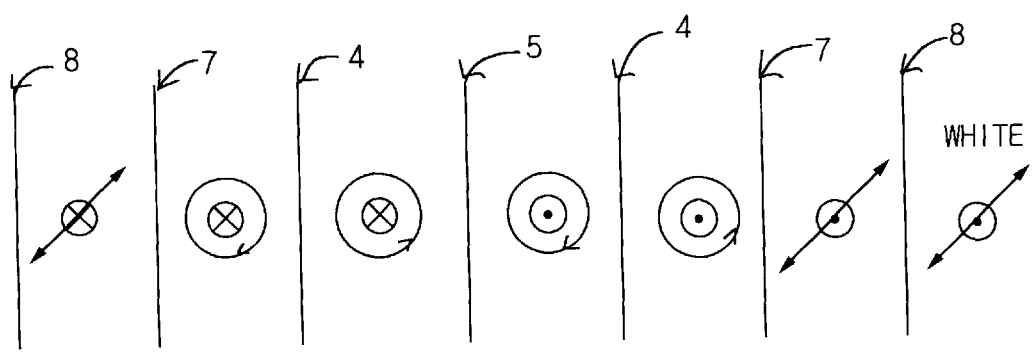
FIG. 2A and FIG. 2B show the progress of light, when the liquid crystal display device according to the present invention acts as a reflection type display.

When a pixel voltage is not connected to the transparent pixel electrode 3, as shown in FIG. 2A, only components with a polarization axis parallel to that of linear polarizer 8 in the incident rays pass inward through the linear polarizer 8. The linearly polarized light passes through the $\lambda/4$ plate 7 becomes right-handed circular polarized. Then the right-handed circularly polarized light passes through the liquid crystal layer 4 and becomes left-handed circular polarized. The left-handed circularly polarized light is reflected from the cholesteric liquid crystal color filter 5 and passes through the liquid crystal layer 4, to become right-handed circular polarized. Then the light passes through the $\lambda/4$ plate 7 and becomes linearly polarized, having a parallel polarization direction to the polarization axis of the linear polarizer 8. Therefore, the light passes through the linear polarizer 8 unchanged, so that bright image e.g., (white or the color dictated by the filters 5 and 9) is displayed.

For convenience of explanation, the filtering effect of the cholesteric liquid

For convenience of explanation, the filtering effect of the cholesteric liquid crystal color filter 5 will not be described hereinafter. However, in practice only a color of the pertinent region in the cholesteric liquid crystal color filter 5 where the light is reflected is displayed. The filtering effect in the cholesteric liquid crystal color filter 5 will be disregarded.

In the present invention, the cholesteric liquid crystal color filter 5 functions to increase the color purity of the absorptive color filter 9. Also, a color shift according to viewing angle which can be generated from the cholesteric liquid crystal color filter 5 is prevented by the absorptive color filter 9.

Figure 2B:
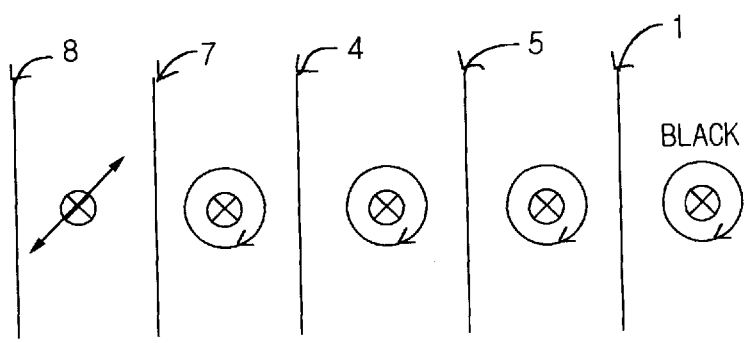

When a pixel voltage is connected to the transparent pixel electrode 3, as shown in FIG. 2B, only components with a polarization axis parallel to that of linear polarizer 8 in the incident rays pass inward through the linear polarizer 8. The linearly polarized light passes through the $\lambda/4$ plate 7 and becomes right-handed circular polarized. Then, the right-handed circularly polarized lights passes through the liquid crystal layer 4 unchanged and enters the cholesteric liquid crystal color filter 5. The right-handed circularly polarized incident rays pass through the cholesteric liquid crystal color filter 5 and the right-handed circular polarizer 1 unchanged. As a result, dark image (e.g., black) is displayed at the linear polarizer 8.

Hereinafter, when the liquid crystal display device according to the present invention is operated as a transmission type display, such operation is described referring to the FIG. 3a and FIG. 3B.

Figure 3A:
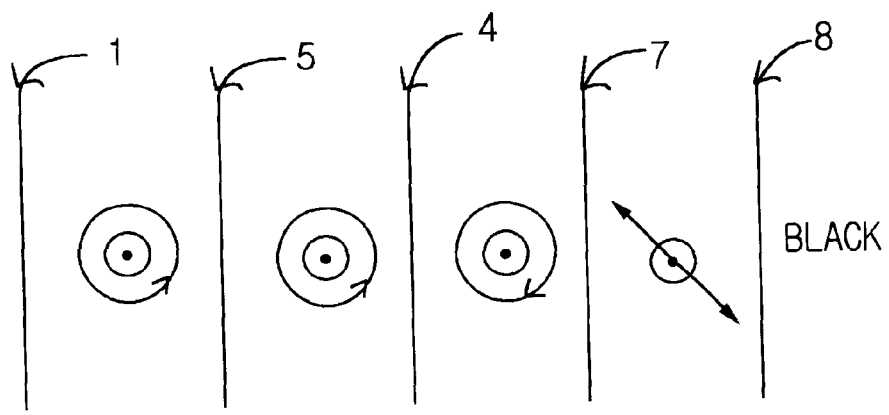
FIG. 3A and FIG. 3B show the progress of light, when the liquid crystal display device according to the present invention acts as a transmission type display.

When a pixel voltage is not connected to the transparent pixel electrode 3, as shown in FIG. 3A, light generated from a backlight (not shown in drawings), which confronts the right-handed circular polarizer 1, enters the right-handed circular polarizer 1. Only the right-handed circularly polarized components of the visible light in the incident rays pass through the right-handed circular polarizer 1. The right-handed circularly polarized light passes through the cholesteric liquid crystal color filter 5 unchanged and then passes through h the liquid crystal layer 4, thereby becoming left-handed circular polarized. The left-handed circularly polarized light passes through the $\lambda/4$ plate 7 to become linearly polarized in a perpendicular direction to a polarization axis of a linear polarizer 8. As a result, the light is intercepted by the linear polarizer 8 so that a dark image (e.g., black) is displayed.

Figure 3B:
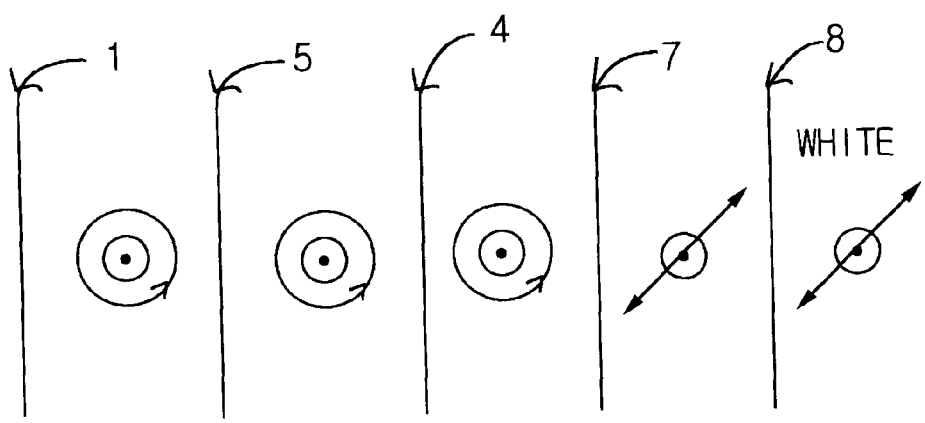

When a pixel voltage is connected to the transparent pixel electrode 3, as shown in FIG. 3B, light generated from the backlight enters the right-handed circular polarizer 1. Only the right-handed circularly polarized components of the visible light in the incident rays pass through the right-handed circular polarizer 1. The right-handed circularly polarized light passes through the cholesteric liquid crystal color filter 5 and the liquid crystal layer 4 unchanged. This light also passes through the $\lambda/4$ plate 7, so that it becomes linearly polarized in a parallel direction to the polarization axis of the linear polarizer 8. Therefore, the light passes through the linear polarizer 8 unchanged, so that a bright image (e.g., white) is displayed. In this case, the absorptive color filter 9 plays a role of a color filter, and any color shift according to viewing angle which can be generated from the cholesteric liquid crystal color filter 5 is prevented by the absorptive color filter 9.

The cholesteric liquid crystal color filter 5 is formed on the transparent pixel electrode according to the above explanation, but the color filter 5 can be provided at all positions between the liquid crystal layer 4 and the circular polarizer 1. For example, the color filter 5 can be provided above the thin film transistor and the transparent pixel electrode 3.

Also, the absorptive color filter 9 is provided on the second substrate 6 but it can be formed on the first substrate 2.

The transmission-reflection type liquid crystal display device according to the present invention can be driven as a transmission type or reflection type display by selection of users, depending on an external environment. Further, the cholesteric liquid crystal color filter 5 having a high color purity is added to the conventional absorptive color filter 9, so that the color purity of the liquid crystal display device is improved.

Many different embodiments of this invention may be made without departing from the spirit and scope thereof, it is to be understood that the invention is not limited to the specific embodiments thereof except as defined in the appended claims.

What is claimed is:

1. A liquid crystal display device, comprising:
   a first transparent substrate;
   a second transparent substrate;
   a liquid crystal layer between the first transparent substrate and the second transparent substrate, the liquid crystal being horizontally arranged when a voltage is not applied;
   a linear polarizer on the second transparent substrate;
   a cholesteric liquid crystal circular polarizer provided on the first transparent substrate;
   backlight disposed under the cholesteric liquid crystal circular polarizer, the backlight generating unpolarized light; and
   a cholesteric liquid crystal color filter provided on the first transparent substrate in order to be situated between the cholesteric liquid crystal circular polarizer and the liquid crystal layer; and
   an absorptive color filter on one of the first or second transparent substrates in order to prevent any color shift according to viewing angle which can be generated from the cholesteric liquid crystal circular polarizer, wherein the liquid crystal display device is a transmission-reflection liquid crystal display device.

2. The liquid crystal display device of claim 1, further comprising:
   a $\lambda/4$ phase shift plate between the linear polarizer and the liquid crystal layer.

3. The liquid crystal display device of claim 1, wherein when a voltage is not impressed on the liquid crystal layer, the liquid crystal layer imparts a phase shift of $\lambda/2$ to light transmitted through the liquid crystal layer.

4. The liquid crystal display device of claim 1, wherein the circular polarizer includes a left handed helical cholesteric liquid crystal having a range of pitch values of (380 nm~800 nm)/n, where n is an average index of refraction of cholesteric liquid crystal.

5. The liquid crystal display device of claim 1, wherein the cholesteric liquid crystal color filter includes left-handed cholesteric liquid crystal.

6. The liquid crystal display device of claim 1, wherein the absorptive color filter has a transmittance in a range of 50% to 80%.

7. The liquid crystal display device of claim 1, further comprising:
   at least one transparent electrode between the first transparent substrate and the second transparent substrate.

8. A liquid crystal display device, comprising:
   a lower transparent substrate;
   an upper transparent substrate;
   a liquid crystal layer between the lower transparent substrate and the upper transparent substrate, the liquid crystal display being horizontally arranged when a voltage is not applied;
   a linear polarizer on the upper transparent substrate;
   a $\lambda/4$ phase shift plate between the linear polarizer and the liquid crystal layer; and
   a cholesteric liquid crystal color filter proximate to the lower transparent substrate to selectively reflect ambient light and to transmit light from a backlight; and
   a cholesteric liquid crystal polarizer under the cholesteric liquid crystal color filter; and
   an absorptive color filter on one of the first or second transparent substrates in order to prevent any color shift according to viewing angle which can be generated from the cholesteric liquid crystal circular polarizer, wherein the backlight is disposed under the cholesteric liquid crystal polarizer, and the liquid crystal display device is capable of transmitting light from the backlight and reflecting ambient light.

9. The liquid crystal display device of claim 8, wherein ambient light is selectively reflected from the cholesteric liquid crystal color filter, depending on whether a voltage is applied across the liquid crystal layer.

10. The liquid crystal display device of claim 9, wherein the $\lambda/4$ phase shift plate induces a $\lambda/4$ phase shift in the reflected ambient light.

11. The liquid crystal display device of claim 8, wherein light from the backlight transmitted by the cholesteric liquid crystal color filter is selectively passed by the linear polarizer, depending on whether a voltage is applied across the liquid crystal layer.

12. The liquid crystal display device of claim 11, wherein the $\lambda/4$ phase shift plate induces a $\lambda/4$ phase shift in the transmitted light from the backlight.

13. The liquid crystal display device of claim 8, further comprising:
   a transparent common electrode adjacent to the liquid crystal layer; and
   a transparent pixel electrode adjacent to the liquid crystal layer to, in conjunction with the transparent common electrode, apply a voltage across the liquid crystal layer.

14. A liquid crystal display device, comprising:
   a polarizing layer;

a phase shifting layer adjacent to the polarizing layer;

a filter layer to selectively reflect light from a front of the device and to transmit light from a backlight, the backlight being disposed under the absorbing polarizing layer and generating unpolarized light;

a liquid crystal layer between the phase shifting layer and the filter layer, the liquid crystal being horizontally arranged when a voltage is not applied; and a circularly polarizing layer proximate to the backlight to introduce a circular polarization from the light therefrom;and an absorptive color filter proximate to the liquid crystal layer to, in conjunction with the filter layer, produce light of good color purity, wherein the liquid crystal display device is capable of transmitting light from the backlight and reflecting light from a front of the device.

15. The liquid crystal display device of claim 14, wherein the light from the front of the device is selectively reflected from the filter layer, depending on whether a voltage is applied across the liquid crystal layer.

16. The liquid crystal display device of claim 15, wherein the light from the front of the device is transmitted by the filter layer when a voltage is applied across the liquid crystal layer.

17. The liquid crystal display device of claim 14, wherein light from the backlight transmitted by the filter layer is selectively transmitted by the polarizing layer, depending on whether a voltage is applied across the liquid crystal layer.

18. The liquid crystal display device of claim 14, further comprising:

a transparent common electrode adjacent to the liquid crystal layer; and a transparent pixel electrode adjacent to the liquid crystal layer to, in conjunction with the transparent common electrode, apply a voltage across the liquid crystal layer.

19. The liquid crystal display device of claim 14, wherein the filter layer includes a left-handed cholesteric liquid crystal color filter.

20. The liquid crystal display device of claim 19, wherein the left-handed cholesteric liquid crystal color filter includes a plurality of color regions, each having a different pitch.

* * * * *